(12) United States Patent
Cord et al.

(10) Patent No.: US 7,651,126 B2
(45) Date of Patent: Jan. 26, 2010

(54) DEVICE FOR IMPLEMENTING A SECURITY ELEMENT FOR THE PROTECTION OF GOODS AND/OR PERSONS

(75) Inventors: Paul-Philippe Cord, Paris (FR); Virginie Desbleumortiers, Orly (FR); Fabrice Boyer, Paris (FR); Michael Niehaus, Stutensee (DE)

(73) Assignees: Seva Technologies (FR); Etienne Lacroix (FR)

( * ) Notice: Subject to any disclaimer, the term of this patent is extended or adjusted under 35 U.S.C. 154(b) by 0 days.

(21) Appl. No.: 11/245,656

(22) Filed: Oct. 7, 2005

(65) Prior Publication Data
US 2006/0071455 A1    Apr. 6, 2006

Related U.S. Application Data

(63) Continuation of application No. PCT/FR2004/000935, filed on Apr. 15, 2004.

(30) Foreign Application Priority Data
Apr. 15, 2003    (FR) .................................. 03 50107

(51) Int. Cl.
*B60R 21/16*    (2006.01)
*C06B 31/28*    (2006.01)

(52) U.S. Cl. ........................................ 280/734; 149/46

(58) Field of Classification Search ................. 280/734; 149/46
See application file for complete search history.

(56) References Cited

U.S. PATENT DOCUMENTS

| 3,663,035 A | * | 5/1972 | Norton ....................... 280/734 |
| 6,149,193 A | | 11/2000 | Canterberry et al. |
| 2003/0051630 A1 | | 3/2003 | Katsuda et al. |

FOREIGN PATENT DOCUMENTS

| EP | 0 116 795 A1 | 8/1984 |
| EP | 0 816 307 A1 | 1/1998 |
| WO | WO 01/89885 A1 | 11/2001 |

* cited by examiner

*Primary Examiner*—Aileen Felton
(74) *Attorney, Agent, or Firm*—DLA Piper LLP (US)

(57) ABSTRACT

A device for protecting goods and/or persons including a security element; and a gas generating system connected to the security element and including an explosive charge formed at least of: a primary pyrotechnic compound, in a first chamber, initiated by at least one initiator having a reinforcing charge and including at least one propellant having an optionally adjusted oxygen balance, and a secondary compound, in a secondary chamber, including an oxidant constituent capable of delivering only gas by decomposition and at least one reducing additive having a function of contributing nitrogen, the additive being present in a proportion by weight less than about 70% of the weight of the primary-secondary compound.

22 Claims, 1 Drawing Sheet

US 7,651,126 B2

DEVICE FOR IMPLEMENTING A SECURITY ELEMENT FOR THE PROTECTION OF GOODS AND/OR PERSONS

RELATED APPLICATION

This is a continuation of International Application No. PCT/FR2004/000935, with an international filing date of Apr. 15, 2004 (WO 2004/091981 A1, published Oct. 28, 2004), which is based on French Patent Application No. 03/50107, filed Apr. 15, 2003.

TECHNICAL FIELD

This disclosure relates to the field of devices of the type comprising a gas generating system for the implementation, in particular, of a security element for the protection of goods and/or persons.

More particularly, the disclosure relates to a device for the implementation of a security element, especially for the protection of at least one occupant of a vehicle, of the type comprising a gas generating system connected to the security element, for example, to an inflatable safety cushion, and comprising an explosive charge formed at least by a primary pyrotechnic compound and a secondary compound.

BACKGROUND

WO 01/89885 discloses a device for implementing an element, particularly a security element, for the protection of goods and/or persons and especially for the protection of at least one occupant of a vehicle, of the type comprising a gas generating system connected to the security element, for example, an inflatable safety cushion, and comprising an explosive charge formed at least by a primary pyrotechnic compound and a secondary compound. In that system, the primary pyrotechnic compound is intended to steer decomposition of the secondary compound and permits at least one interaction of the combustion products of the primary and secondary compound(s) in at least one unconfined or weakly confined interaction volume of the gas generating system, where the interaction may at least partially be, in particular, an oxidation-reduction reaction.

The gas generation system according to WO 01/89885 is different from other systems as for instance a simple effect generator such as the one described in U.S. 2003/0051630 or a double effect generator such a the one described in U.S. Pat. No. 6,149,193, particularly due to the fact that the decomposition of the secondary compound is driven by the primary compound.

The composition envisaged in that disclosure is satisfactory, but the device has the principal disadvantage of giving off a considerable amount of nitrogen oxides. Furthermore, that composition, or a composition of that type, brings about the formation of much water, which after condensing is detrimental to the gas yield. Moreover, that composition requires the consumption of all the oxygen present in the ammonium nitrate, so that at least 40% of propellant has to be included in the composition.

SUMMARY

We provide relates to a device for protecting goods and/or persons including a security element; and a gas generating system connected to the security element and including an explosive charge formed at least of: a primary pyrotechnic compound, in a first chamber, initiated by at least one initiator having a reinforcing charge and including at least one propellant having an optionally adjusted oxygen balance, and a secondary compound, in a secondary chamber, including an oxidant constituent capable of delivering only gas by decomposition and at least one reducing additive having a function of contributing nitrogen, the additive being present in a proportion by weight less than about 70% of the weight of the primary-secondary compound.

DETAILED DESCRIPTION

Figure 1:
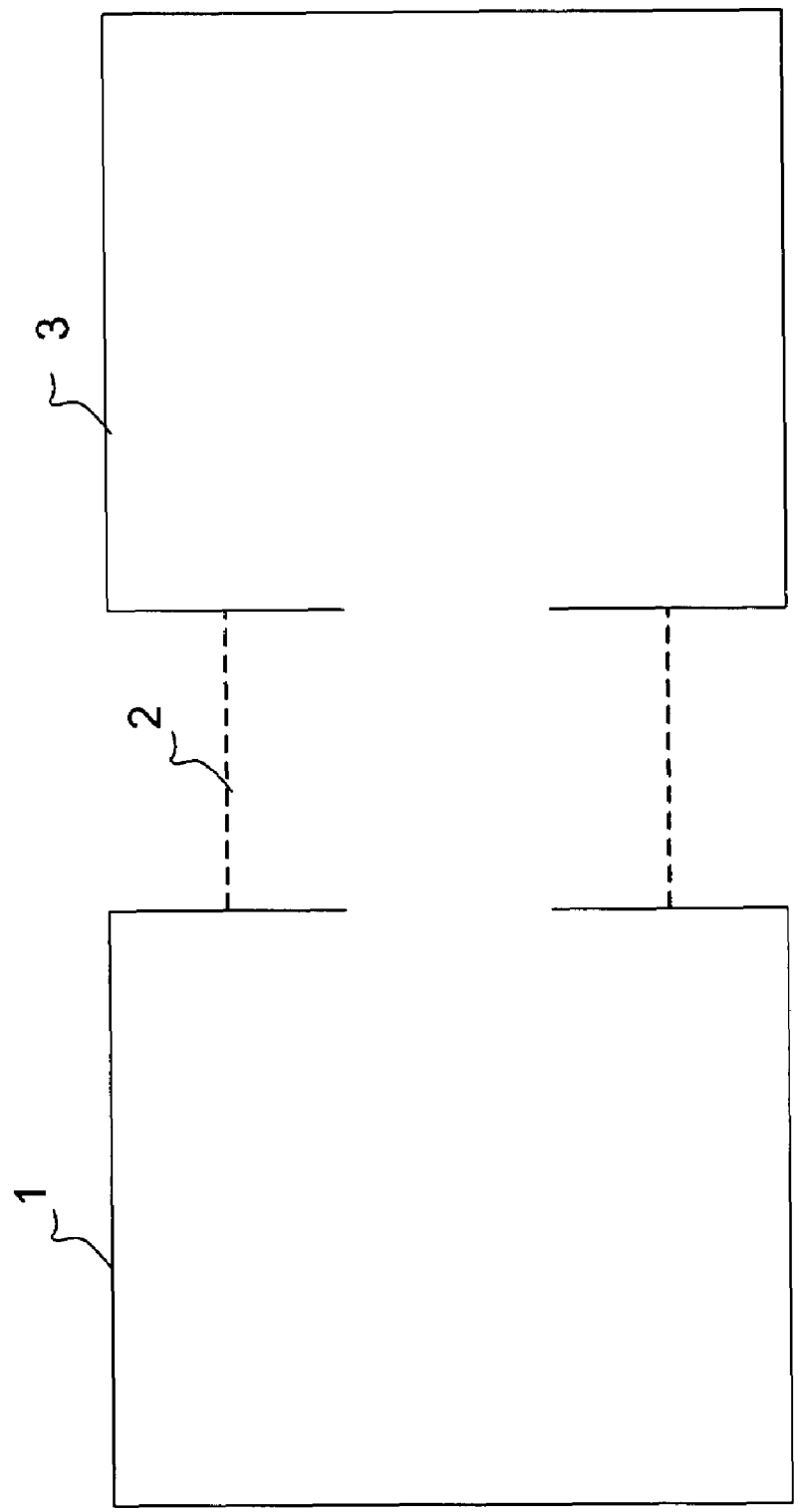
FIG. 1 shows a device according to an embodiment of the present invention. The device includes a first chamber 1, an unconfined or weakly confined interaction volume 2 and a second chamber 3.

We provide a particular composition for a device of the type comprising a gas generating system, particularly for the implementation of a security element, having a particular composition for the secondary compound such that, in a surprising manner, the nitrogen oxide emissions are drastically reduced, nevertheless without the emission of solid particles and while ensuring a low release of carbon monoxide.

This particular composition for the secondary constituent furthermore permits the percentage of propellant to be reduced and limits the amount of water formed.

To do this, the device comprises a gas generating system, particularly for implementing a security element for the protection of goods and/or persons, especially for the protection of at least one occupant of a vehicle, the gas generating system being connected to the security element, for example, to an inflatable cushion, and comprising an explosive charge formed at least by a primary pyrotechnic compound, in a first chamber, initiated by at least one initiator furnished with a reinforcing charge and a secondary compound, the primary component comprising at least one propellant, for example, a double base propellant or those of the nitrocellulose base type, nitramines, of the LOVA type or any of those conventionally used for inflatable safety cushions, the oxygen balance possibly having been adjusted, characterized in that the secondary compound, in a secondary chamber, comprises an oxidant constituent capable of delivering only gas by decomposition; at least one reducing additive having a function of supplying nitrogen, the additive being present in a proportion by weight less than about 70% of the weight of the primary-secondary assembly.

The primary and secondary compounds may be in solid form. Thus, according to one aspect, the primary and secondary compounds each form a monolithic, homogeneous explosive charge.

According to another aspect, the primary and secondary compounds form a hetero-geneous monolithic explosive charge and the primary and secondary compounds are in bulk form, pelletized or not, or in the form of at least one sheet, flat or rolled, or at least one strand.

Advantageously, the secondary compound may be placed in a chamber, the chamber having an effective pressure (integral $P=\int f(t)/t$) lower than about 50 bars during combustion of the secondary compound. The pressure may be obtained by adjustment of the diameter of a nozzle of the secondary chamber.

Advantageously, the secondary compound may be placed in a chamber, the chamber having a pressure of at least about 50 bars during combustion of the secondary compound. The pressure may be obtained by adjustment of the diameter of the secondary chamber.

Advantageously, the secondary compound, placed in the secondary chamber, may have a pressure less than or equal to the combustion pressure of the propellant. The pressure may be obtained by adjustment of the diameter of the secondary chamber.

It is important to note that those skilled in the art will be able to implement the pressures envisaged hereinabove in the two chambers simply by varying the diameter of the nozzle according to tables of variation of pressure as a function of the aperture of the nozzle. Thus, the indication of a pressure measurement for each of the chambers is the best means of defining the structure of the device, that is, the diameter of its nozzle.

Advantageously, the reducing additive may be a derivative of guanidine, nitroguanidine, guanidine nitrate, or another guanidine derivative.

The reducing additive may be present in the secondary compound in a proportion by weight comprised between about 20 and about 60% of the primary-secondary assembly. The reducing additive may be present in the secondary compound in a proportion by weight comprised between about 35 and about 50% of the primary-secondary assembly.

Advantageously, the reducing additive may be polyester, present in the secondary compound in a proportion by weight less than about 15% of the primary-secondary assembly. The reducing additive may be ammonium acetate, present in the secondary compound in a proportion by weight less than about 20% of the primary-secondary assembly.

The reducing additive may be oxamide and/or ammonium oxamide or one of its derivatives, present in the secondary compound in a proportion by weight of less than about 30% of the primary-secondary assembly. The reducing additive may be urea of a urea derivative, such as nitrourea, present in the secondary compound in a proportion by weight less than about 30% of the primary-secondary assembly.

The reducing additive may be hexogen and/or octogen, present in the secondary compound in a proportion by weight less than about 60% of the primary-secondary assembly. The reducing additive may be aminotetrazole, in a proportion by weight less than about 70% of the primary-secondary assembly.

The propellant may be present in the primary compound in present in a proportion by weight less than about 40% of the primary-secondary assembly. The propellant may be present in the primary compound in present in a proportion by weight of less than about 20% of the primary-secondary assembly. The propellant may be present in the primary compound in a proportion by weight of less than about 10% of the primary-secondary assembly.

The secondary compound comprises at least one catalyst in a proportion less than about 5% of the primary-secondary assembly. The catalyst may be chosen from among the derivatives of copper II (degree of oxidation), such as, for example, copper oxide or copper phthalocyanate, and/or chromium derivatives, chromates and bichromates, and/or iron derivatives such as iron oxides, and metals of the first transition group.

According to a particularly advantageous aspect, the primary-secondary assembly forms a negative oxygen balance. The primary compound may be a compound having a negative or zero oxygen balance. In that case, the primary and/or secondary compound(s) comprises a supply of oxidant, such as alkali, alkaline earth or ammonium perchlorates, possibly associated with an alkali or alkaline earth nitrate.

It should be noted that the particular use of the device may be in the pressurizing of enclosures or jacks.

Our devices will be better understood on reading the description, given hereinafter purely by way of explanation, of several possible, non-limiting aspects.

The methods of implementation and the device for implementing a security element are the same as those described in WO 01/89885, and will not be further described herein.

EXAMPLE 1

The primary comprises 4 g of propellant double base 1152 (nitrocellulose/nitroglycerin) and the secondary comprises 16 g of a bulk mixture of 60% ammonium nitrate, 40% nitroguanidine.

The results for this charge in the security element are as follows:
  maximum pressure in a closed enclosure of 60 L filled with nitrogen at one bar: 3.5 bars relative at 30 ms,
  proportion of carbon monoxide: 2%, i.e. 500 ppm (parts per million) after dilution in a volume of 2,500 L; proportion of nitrogen, 0.15%, i.e., substantially 40 ppm after dilution in a volume of 2,500 L. Moreover, these results are substantially the same when firing is effected in a containing bag of 90 liters fired in a tank of 2,500 liters, i.e., 30 ppm of NOx and 550 ppm of carbon monoxide.

The pressure in the primary compound chamber is 200 bars, while the effective pressure in the secondary compound chamber is 50 bars.

EXAMPLE 1A

Increase of the NA/SD ratio:

The primary comprises 4 g of propellant double base 1152 (nitrocellulose/nitroglycerin) and the secondary comprises 24 g of a bulk mixture of 60% ammonium nitrate, 40% nitroguanidine.

Results for this charge in the security element are as follows:
  maximum pressure in a closed enclosure of 60 L filled with nitrogen at one bar: 5.4 bars relative at 30 ms,
  the proportions of carbon monoxide and nitrogen oxides are substantially analogous to the preceding case.

EXAMPLE 1B

Influence of the quantity of matter and the period of operation, for applications of period of the order of 0.5 second:

The primary comprises 12 g of propellant double base 1131 (nitrocellulose/nitroglycerin) and the secondary comprises 48 g of a bulk mixture of 60% ammonium nitrate, 40% nitroguanidine.

The results for this charge in the security element are as follows:
  maximum pressure in a closed enclosure of 60 L filled with nitrogen at one bar: 6.2 bars relative at 400 ms,
  proportion of carbon monoxide: 4.5%, and proportion of nitrogen oxides 0.2%.

The pressure in the primary compound chamber is less than 100 bars, while the effective pressure in the secondary compound chamber is less than 50 bars.

EXAMPLE 2

This example serves to illustrate in particular the effectiveness of iron oxide as a catalyst of the reduction of nitrogen oxides.

The primary compound comprises 4 g of propellant double base 1152 (nitrocellulose/nitroglycerin) and the secondary compound comprises 16 g of a pelletized mixture of 70% ammonium nitrate, 30% nitroguanidine.

The results are as follows:
the addition of 1.5% iron oxide enabled the amount of NOx (nitrogen dioxide), measured in a volume of 2,500 L, to be reduced by more than 50%,
the amount of carbon monoxide only increases by 10% to 400 ppm under these same conditions.

The pressure of the primary compound chamber is 200 bars, while the effective pressure in the nitrate secondary compound chamber is 50 bars.

EXAMPLE 3

This third example serves to indicate the influence of the pressure in the post-combustion chamber on the amount of NOx:

The primary compound comprises 4 g of propellant double base 1152 (nitrocellulose/nitroglycerin), while the secondary compound comprises 16 g of a powdery mixture of 60% ammonium nitrate, 40% nitroguanidine.

The results for this charge, identical to Example 1, are as follows:
maximum pressure in a closed enclosure of 60 L filled with nitrogen at one bar: 3.5 bars relative at 30 ms,
proportion of carbon monoxide: 2%, i.e. 500 ppm after dilution in a volume of 2,500 L; proportion of nitrogen oxides, 0.10%, i.e. 25 ppm (parts per million) after dilution in a volume of 2,500 L (liters).

The pressure in the primary compound chamber is 200 bars, while the pressure in the nitrate secondary compound chamber is 120 bars.

EXAMPLE 4

This example assesses the advantage of addition of an oxidant:

The primary compound comprises 4 g of propellant double base 1152 (nitrocellulose/nitroglycerin), while the secondary compound comprises 16 g of a powdery mixture of 55% ammonium nitrate, 40% nitroguanidine, 3% potassium perchlorate, 1.5% iron oxide.

The results for this charge are as follows:
maximum pressure in a closed enclosure of 60 L filled with nitrogen at one bar: 3.5 bars relative,
proportion of carbon monoxide: 1%, i.e. 250 ppm after dilution in a volume of 2,500 L; proportion of nitrogen oxides, 0.20%, i.e. 50 ppm after dilution in a volume of 2,500 L.

The pressure in the primary compound chamber is 200 bars, while the pressure in the nitrate secondary compound chamber is 120 bars.

Our devices are described hereinabove by way of example. It is understood that those skilled in the art are able to produce different alternatives without departing from the scope of the appended claims.

The invention claimed is:

1. A device for protecting goods and/or persons comprising:
a security element; and
a gas generating system connected to the security element and comprising an explosive charge formed at least of:
a primary pyrotechnic compound, in a first chamber, initiated by at least one initiator having a reinforcing charge and comprising at least one propellant having an optionally adjusted oxygen balance, and
a secondary compound different than the primary compound, in a secondary chamber having a nozzle with a selected diameter such that the secondary chamber has a pressure of at least about 50 bars during combustion of the secondary compound, wherein the secondary compound decomposes in response to decomposition of the primary compound and comprises 1) an oxidant constituent that delivers gas only by decomposition, and 2) at least one reducing additive that contributes nitrogen, the additive being present in a proportion by weight less than about 70% of the weight of the primary-secondary compound; and
an unconfined or a weakly confined interaction volume connected to the first chamber and the secondary chamber which receives combustion products from the primary and secondary compounds.

2. The device according to claim 1, wherein the primary and secondary compounds are solid.

3. The device according to claim 1, wherein the secondary compound, placed in the secondary chamber, provides a pressure less than or equal to combustion pressure of the propellant, and the pressure is obtained by adjusting the diameter of the secondary chamber.

4. The device according to claim 1, wherein the reducing additive is a derivative of guanidine, nitroguanidine, guanidine nitrate, or another guanidine derivative.

5. The device according to claim 4, wherein the reducing additive is present in the secondary compound in a proportion by weight between about 20 and about 60% of the primary-secondary assembly.

6. The device according to claim 4, wherein the reducing additive is present in the secondary compound in a proportion by weight between about 35 and about 50% of the primary-secondary assembly.

7. The device according to claim 1, wherein the reducing additive is polyester, present in the secondary compound in a proportion by weight less than about 15% of the primary-secondary assembly.

8. The device according to claim 1, wherein the reducing additive is ammonium acetate present in the secondary compound in a proportion by weight less than about 20% of the primary-secondary assembly.

9. The device according to claim 1, wherein the reducing additive is oxamide and/or ammonium oxamide or one of its derivatives, present in the secondary compound in a proportion by weight of less than about 30% of the primary-secondary assembly.

10. The device according to claim 1, wherein the reducing additive is urea or a urea derivative, such as nitrourea, present in the secondary compound in a proportion by weight of less than about 30% of the primary-secondary assembly.

11. The device according to claim 1, wherein the reducing additive will be hexogen and/or octogen, present in the secondary compound in a proportion by weight of less than about 60% of the primary-secondary assembly.

12. The device according to claim 1, wherein the reducing additive is aminotetrazole, in a proportion by weight of less than about 70% of the primary-secondary assembly.

13. The device according to claim 1, wherein the propellant is present in the primary compound in a proportion by weight less than about 40% of the primary-secondary assembly.

14. The device according to claim 1, wherein the propellant is present in the primary compound in a proportion by Weight less than about 20% of the primary-secondary assembly.

15. The device according to claim 1, wherein the propellant is present in the primary compound in a proportion by weight less than about 10% of the primary-secondary assembly.

16. The device according to claim 15, wherein the secondary compound comprises at least one catalyst in a proportion less than about 5% of the primary-secondary assembly.

17. The device according to claim 16, wherein the catalyst is at least one selected from the group consisting of derivatives of copper II (degree of oxidation), copper oxide or copper phthalocyanate, and/or chromium derivatives, chromates and bichromates, and/or iron derivatives, iron oxides, and metals of the first transition group.

18. The device according to claim 1, wherein the primary-secondary assembly forms a negative oxygen balance.

19. The device according to claim 1, wherein the primary compound will be a compound having a negative or zero oxygen balance.

20. The device according to claim 19, wherein the primary or secondary compound(s) comprise(s) a supply of alkali or alkaline earth or ammonium perchiorate, optionally associated with an alkali or alkaline earth nitrate oxidant.

21. The device according to claim 2, wherein the primary and secondary compounds each form a monolithic, homogeneous explosive charge.

22. The device according to claim 2, wherein the primary and secondary compounds each form a heterogeneous monolithic explosive charge and the primary and secondary compounds are in bulk form, pelletized or not, or in the form of at least one sheet, flat or rolled, or at least one strand.

* * * * *